(12) United States Patent
Cesternino

(10) Patent No.: US 8,186,704 B2
(45) Date of Patent: May 29, 2012

(54) GOOSENECK TRAILER ATTACHMENT ASSEMBLY AND CENTER DECK ELEVATION SYSTEM

(76) Inventor: Anthony Cesternino, Callaway, VA (US)

( * ) Notice: Subject to any disclaimer, the term of this patent is extended or adjusted under 35 U.S.C. 154(b) by 183 days.

(21) Appl. No.: 12/815,558

(22) Filed: Jun. 15, 2010

(65) Prior Publication Data

US 2010/0289248 A1    Nov. 18, 2010

Related U.S. Application Data

(63) Continuation-in-part of application No. 11/821,499, filed on Jun. 25, 2007, now abandoned.

(51) Int. Cl.
 *B62D 53/06* (2006.01)
(52) U.S. Cl. ........... 280/425.1; 280/425.2; 280/441.2; 414/24.5; 414/111; 414/481
(58) Field of Classification Search ......... 280/425.1, 280/425.2, 441.2; 414/24.5, 111, 481
See application file for complete search history.

(56) References Cited

U.S. PATENT DOCUMENTS

| | | | | |
|---|---|---|---|---|
| 3,752,502 A | * | 8/1973 | Ehler | 280/440 |
| 4,120,513 A | * | 10/1978 | Hurt | 280/441.2 |
| 4,569,531 A | * | 2/1986 | Beadle | 280/30 |
| 4,806,065 A | * | 2/1989 | Holt et al. | 414/481 |
| 5,040,815 A | * | 8/1991 | Evans | 280/425.2 |
| 6,135,700 A | * | 10/2000 | Collins | 414/476 |
| 6,425,627 B1 | * | 7/2002 | Gee | 296/184.1 |
| 6,874,803 B2 | * | 4/2005 | McDougall et al. | 280/441.2 |
| 7,510,205 B2 | * | 3/2009 | Bellezza Quater et al. | 280/492 |
| 7,976,265 B2 | * | 7/2011 | Badry | 414/482 |

* cited by examiner

*Primary Examiner* — Lesley D Morris
*Assistant Examiner* — Marlon Arce
(74) *Attorney, Agent, or Firm* — Charles T. Joyner

(57) ABSTRACT

Taught herein is a trailer having a gooseneck that can be engaged with the fifth wheel of a road tractor, rear truck unit, and a detachable cargo deck connecting the gooseneck with the truck unit. The cargo deck may be detached from the gooseneck and rested on the ground to allow heavy equipment to be loaded onto the cargo deck. The cargo deck can be reattached to the gooseneck, and elevated and locked into any one of three positions, each substantially parallel with the road, by an elevating means in the gooseneck and the truck unit. Thus the trailer of the present invention can be configured to accommodate cargo have a wide range of weight and size.

5 Claims, 9 Drawing Sheets

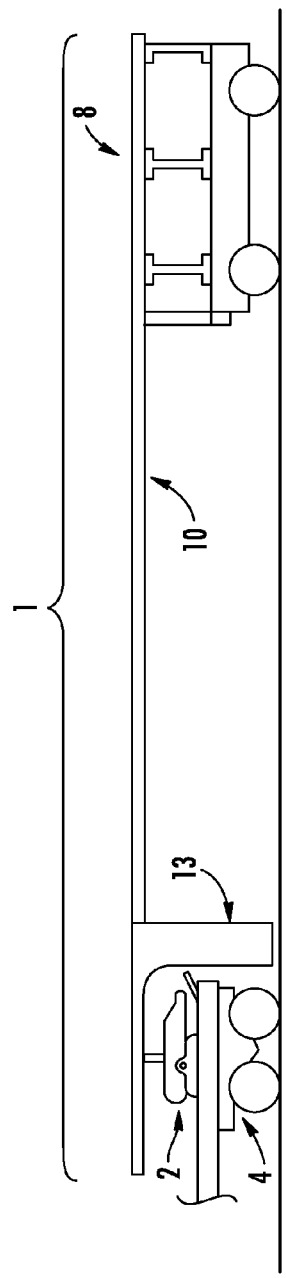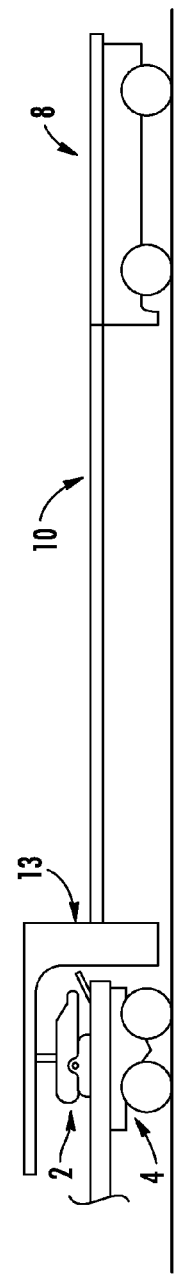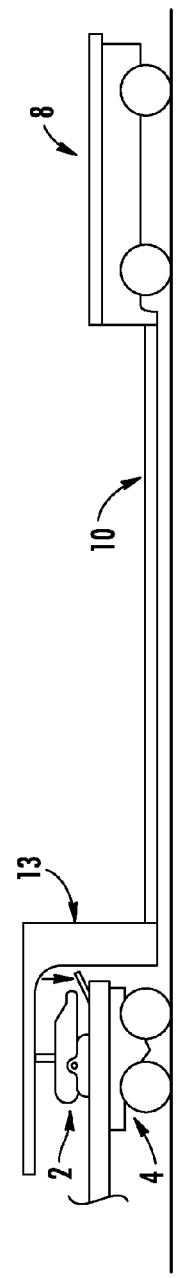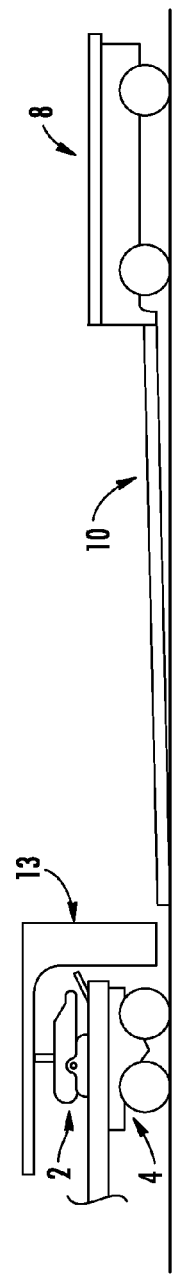
FIG. 1D
FIG. 1C
FIG. 1B
FIG. 1A

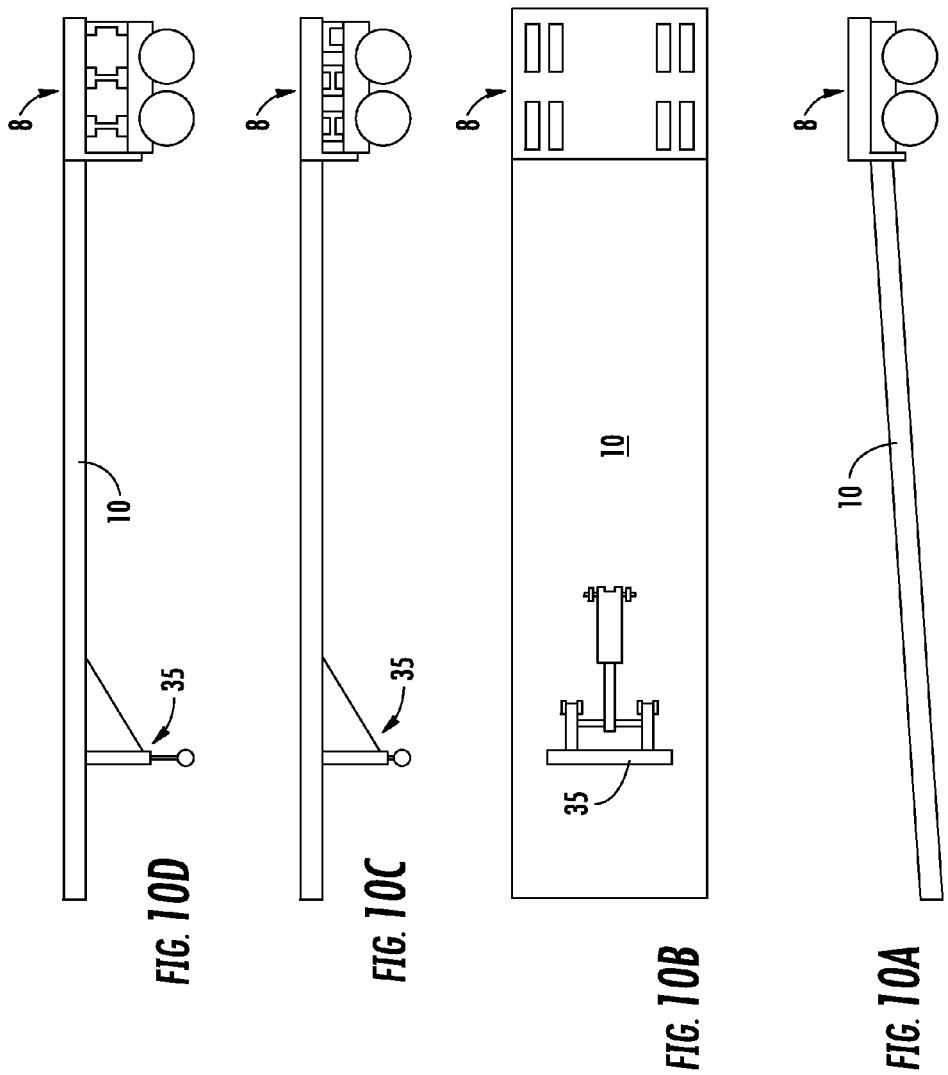

GOOSENECK TRAILER ATTACHMENT ASSEMBLY AND CENTER DECK ELEVATION SYSTEM

CROSS REFERENCE

This application is a continuation-in-part of pending application Ser. No. 11/821,499, filed Jun. 25, 2007 now abandoned.

TECHNICAL FIELD

This invention relates to platform trailers and particularly to platform trailers with detachable goosenecks, which permit the trailers' center and rear decks to be adjusted to multiple heights.

BACKGROUND

Platform trailers are used to transport a variety of cargo that can withstand exposure to the weather or a wide range of road conditions. These trailers can be classified into three categories: "lowboy" (also known as "gooseneck"), "flatbed," and "drop deck" trailers.

Lowboy trailers, as the term implies, have low "beds" or "decks," situated close to the road so they can carry tall items that must clear bridges, power lines, and other over head obstacles, while providing a low center of gravity to enhance stability of large loads. Typically a lowboy trailer has a deck that can be detached from the assembly that connects it to the fifth wheel of a road tractor, commonly referred to as a "gooseneck," to facilitate the loading of heavy items such as a piece of construction equipment. A flatbed trailer has a deck that extends the entire length of the trailer and is situated just above the wheels of the tractor and the trailer's wheel assemblies. Its standardized deck height provides good road clearance, and the flatbed trailer is designed to accept cargo, such as a shipping container, from a loading dock with little or no lifting. The drop deck trailer is less common than the other two types. Its deck is above that of a lowboy trailer yet below that of a flatbed trailer and is typically designed to carry specific items.

There is a need to have a single trailer that can be easily configured as a lowboy, flatbed, or drop deck trailer to accommodate any cargo the trailer may be required to carry. To some extent, this need has been recognized in the art. For example, see U.S. Pat. Nos. 2,676,783, 4,806,065, 5,059,083, 6,425,627. However, the trailers of the art typically allow for configuration only as lowboy or flatbed trailers, but not as drop deck trailers for which a need still exists. Further, the trailers of the art are complicated and time consuming to reconfigure, and in some cases are less stable than fixed deck trailers.

SUMMARY OF THE INVENTION

The present invention provides a detachable trailer comprising a gooseneck having a deck and capable of coupling with a road tractor, a truck assembly distal to the gooseneck, and a detachable center deck connecting the gooseneck to the truck assembly and capable of being moved to any of three horizontal positions, between the gooseneck and the truck assembly with each position being substantially parallel to the surface upon which the trailer is situated. The truck assembly has a deck, a wheel assembly, and a means, of moving this deck up or down. The center deck may be locked in position between the gooseneck and to the truck assembly, thereby allowing the trailer to be configured as a lowboy trailer, a drop deck trailer, or a flatbed trailer. This invention alleviates attachment and detachment problems caused by misalignment of gooseneck and the deck, thus expediting conversion from one configuration to another.

BRIEF DESCRIPTION OF THE DRAWINGS

FIG. 1a-FIG. 1d are side views of the present trailer illustrating three positions to which the center and rear deck can be configured.

FIG. 10a-FIG. 10d is a series of views of multi-positions available to drop trailer along with the bottom view of trailer's landing gear device embedded in frame of the trailer.

DETAILED DESCRIPTION

Figure 2:
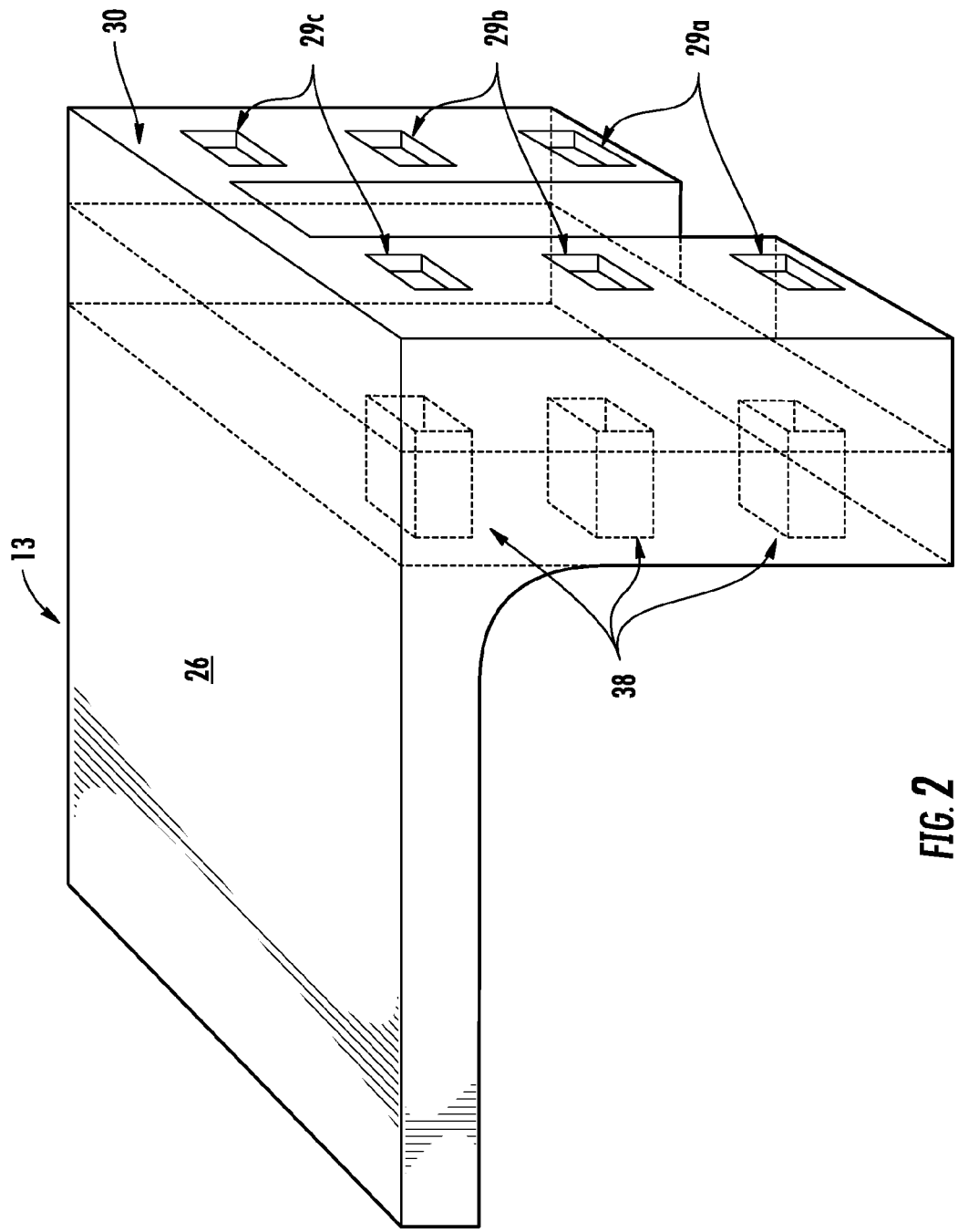
FIG. 2 is a perspective view of the outer frame for elevator and lock assembly in gooseneck of the present trailer.

The present trailer can be configured as a lowboy, drop bed, or flatbed trailer quickly and efficiently. Thus within minutes, this one trailer can be configured to do the job of three trailers. Therefore, an owner of the present trailer can significantly reduce his or her investment in trailers and still carry substantially any load amenable to a platform trailer. Such a reduction in investment is particularly attractive to a small, owner-operated business with limited capital. Further, the present trailer may be fitted with tanks for carrying any liquids typically carried by tanker rigs.

The following terms frequently used herein are defined below:

"Road tractor" or "tractor" is a motor vehicle, usually diesel powered, commonly used to pull a semi-trailer along a road. Typically, at the rear of such a vehicle is a "fifth wheel," i.e., a mechanism for securely attaching a semi-trailer to the vehicle yet allowing for turning.

"Trailer" is a semi-trailer that typically has an elongated, cargo carrying frame supported at one end by a truck assembly and at the other end by a tractor to which the trailer is connected by means of a fifth wheel mechanism. In common usage, a trailer and road tractor are associated and the combination is often referred to as a "semi," "tractor—trailer truck," or "tractor—trailer rig" and are ubiquitous on public highways "Truck assembly" or "truck" is the collection of wheels, axes, and associated components that support one end of a trailer. For some trailers, e.g. those designed to carry very heavy loads, two or more trucks may be required "Gooseneck" is the curved section of a lowboy trailer that is connected to the end of the deck distal from the truck and connects the trailer to the fifth wheel of the tractor. The present trailer employs a gooseneck as will be explained below.

"Deck assembly," "deck," "bed assembly," or "bed" is that portion of a trailer that supports the cargo and typically has an underlying frame and a substantially flat surface. A trailer's deck may be comprised of multiple sub decks, as is the case with the trailer of the present invention. Accordingly, as used herein, "center deck" is the deck assembly between the gooseneck and the truck.

"Ground" means ground in the common meaning of this word, but herein, also includes any surface covering the ground which supports the trailer, such as a hardstand, road, etc.

FIG. 1a-1d constitute an overview of the present trailer, i.e., trailer 1, connected to the fifth wheel 2 of tractor 4 that is mounted above the rear axle assembly of tractor 4. (For clarity of illustration, only the rear section of tractor 4 is shown. Further, the bracket indicating trailer 1 does not include tractor 4 or any portion thereof, and is understood to also apply to FIG. 1a-1c.) As illustrated in these figures, the major components of the trailer are truck assembly (hereinafter, "truck") 8, center deck 10, and gooseneck 13.

FIG. 1a shows center deck 10 detached from gooseneck 13 with the end of the deck proximal to the gooseneck (when attached) resting on the ground and with the distal end connected to truck 8. Thus, tractor 4 carrying gooseneck 13 may be moved away from center deck 10 to allow cargo to be loaded at ground level. For example, a bulldozer might be driven onto center deck 10. After the cargo is loaded onto center deck 10, the deck and gooseneck 13 may be reconnected, and the proximal (distal with respect to truck 8) end of the deck raised by an elevating means (discussed below) of the gooseneck until the deck is parallel to the ground, yet close to the ground, forming a lowboy trailer as illustrated in FIG. 1b.

The elevating means of gooseneck 13 and the corresponding elevating means of truck 8 may be used to raise center deck 10 to its maximum height to form a flatbed trailer as shown in FIG. 1d. (To achieve the position shown in FIG. 1d, the top part of truck 8 must also be raised and the means for doing so is discussed below). Alternatively, center deck 10 may be raised approximately midway between the positions illustrated in FIG. 1b and FIG. 1d to form a drop deck trailer as shown in FIG. 1c. In each of the three positions illustrated in FIG. 1b-1d, a locking means discussed herein below is employed.

Figure 3:
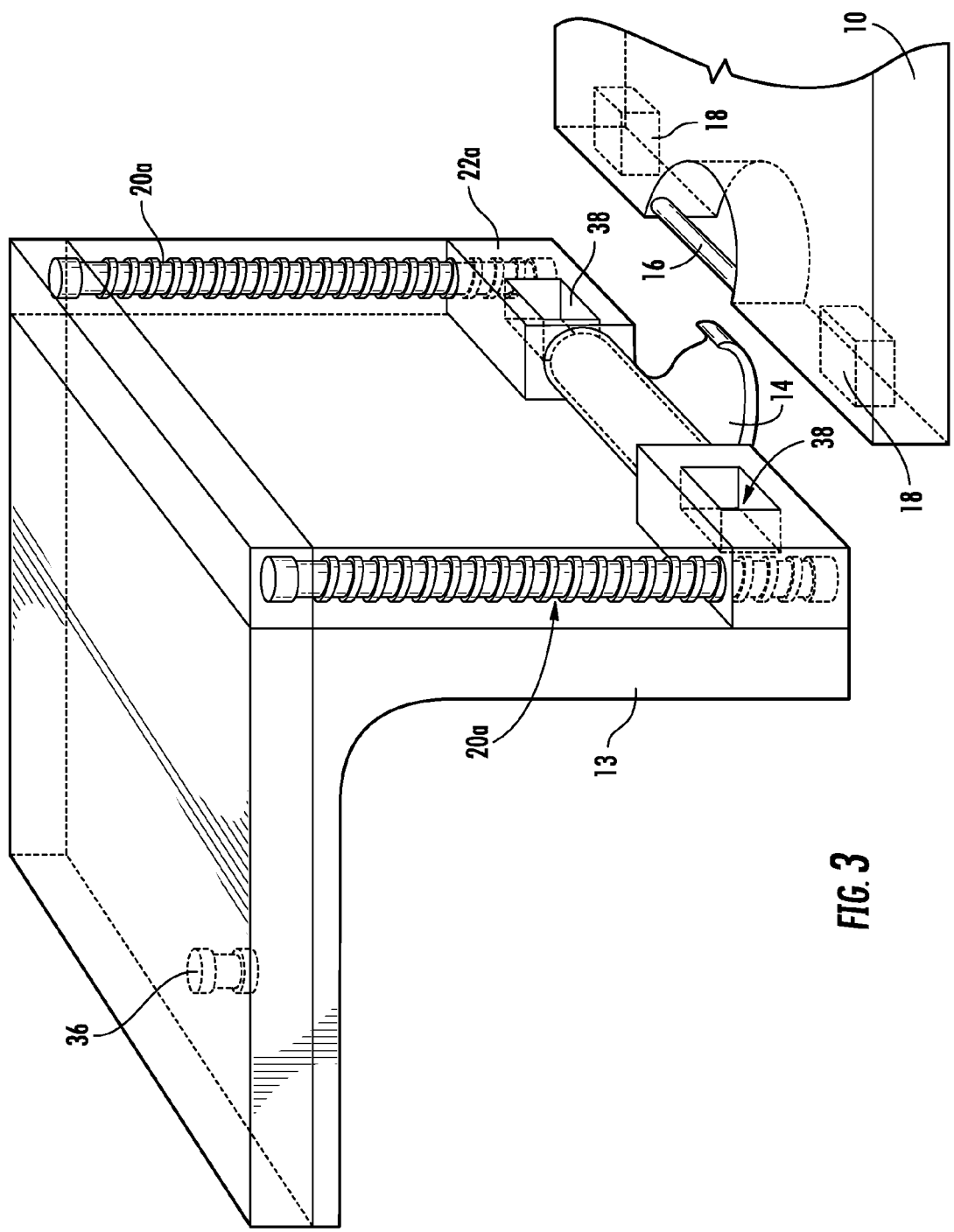
FIG. 3 is a perspective view of riser screws, threaded blocks, lift and lock arm and lockbox in gooseneck, and trailer lift pin with collar and lockbox in trailer.
Figure 4:
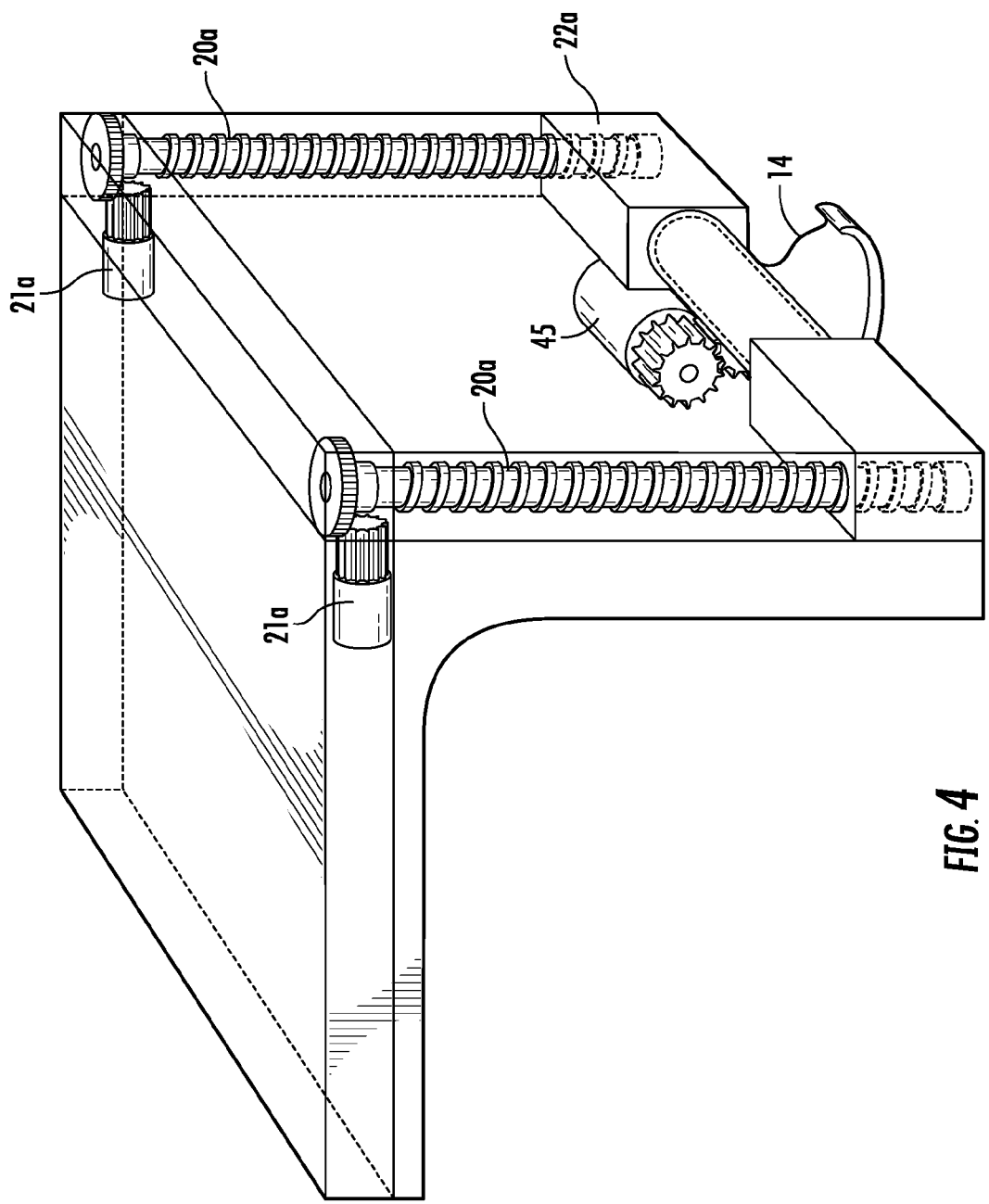
FIG. 4 is a perspective view of electric motors that drive riser screws and lift, and lock arm.

Referring now to FIGS. 2, 3, and 4 collectively, outer frame 30 of gooseneck 13 shows three sets of predetermined height adjustment holes 29a-29c (FIG. 2) corresponding to deck levels 1 through 3 respectively in which the lock bar assembly (discussed below in connection with FIGS. 8-9) slides through. (Deck levels 1 through 3 are depicted in FIG. 1b through 1d respectively.) As seen in FIG. 3, outer frame 30 has been removed to show riser blocks 22a riser screws 20a and a trailer lift arm 14. FIG. 2 shows gooseneck deck 26, which provides additional deck space when the trailer is configured as a flatbed trailer. FIG. 4 (an abridged version of FIG. 2) shows electric motors 21a that operate elevator screws 20a.

Again referring to FIGS. 1a-1d, 2, 3, and 4, once center deck 10, resting on the ground, is loaded, e.g. with a bulldozer, tractor 4 with gooseneck 13, which is locked in a pivotal fifth wheel 2, is backed to center deck 10. Trailer 1 is connected to tractor 4 by towing pin 36 (explicitly shown in FIG. 3) that engages fifth wheel 2 of tractor 4. Connection of trailers to tractors by fifth wheel and towing pins (also referred to as "kingpins") are extensively employed in this art.

Continuing to refer to FIG. 1a-1d, 2, 3, and 4 collectively, once gooseneck 13 which is raised by tractor 4 and electric power from the tractor's electrical system is connected to the trailer, trailer lift arm 14, which is preset to face down before backing, is now activated by electric motor 45, which rotates lift arm 14 (explicitly illustrated in FIG. 3 and FIG. 4). At a predetermined degree of rotation, lift arm 14 makes contact from below with trailer lift pin 16 eventually lifting center deck 10 as lift arm 14 rotates upward lifting center deck 10. Continued rotation then draws both gooseneck 13 and center deck 10 together as lift arm 14. Approximately 180 degrees from starting, i.e. down position, lift arm 14 is straight up and locking trailer lift pin 16 in place (FIG. 3) close to rotating axis of lift arm 14. At this time, slide holes 38 in riser blocks 22a align with lock boxes 18 in center deck 10 and predetermined height adjustment holes 29a-29c in gooseneck outer frame 30. In FIG. 2, for clarity, the three possible positions of only one of the two slide holes are shown.

Figure 8:
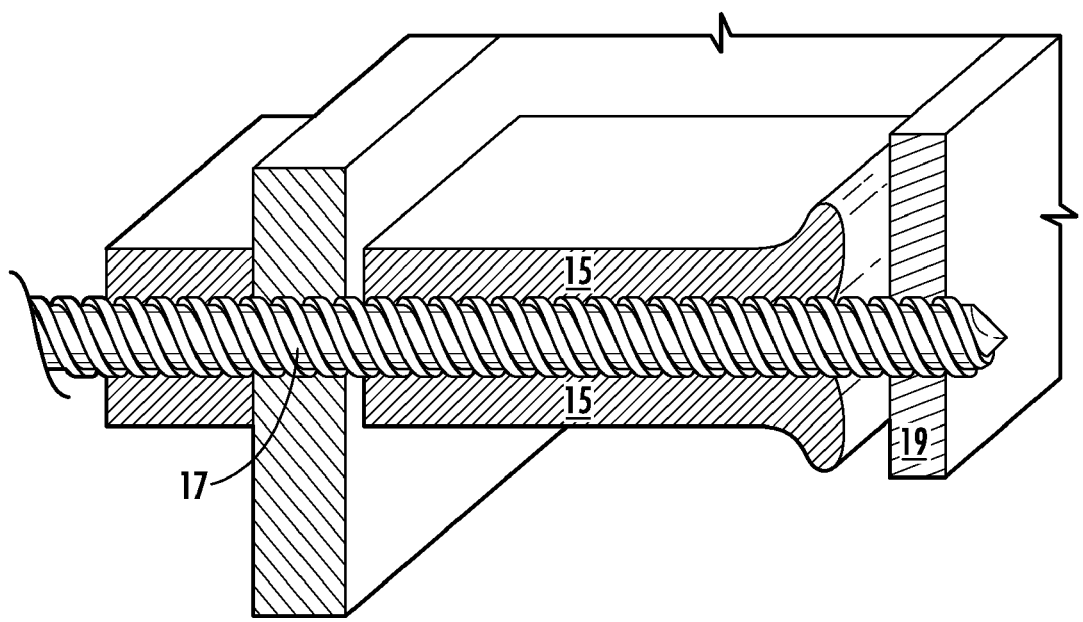
FIG. 8 is a perspective cross sectional view of lock bar and threaded screw in relation to the threaded block in gooseneck and threaded block in the deck.
Figure 9:
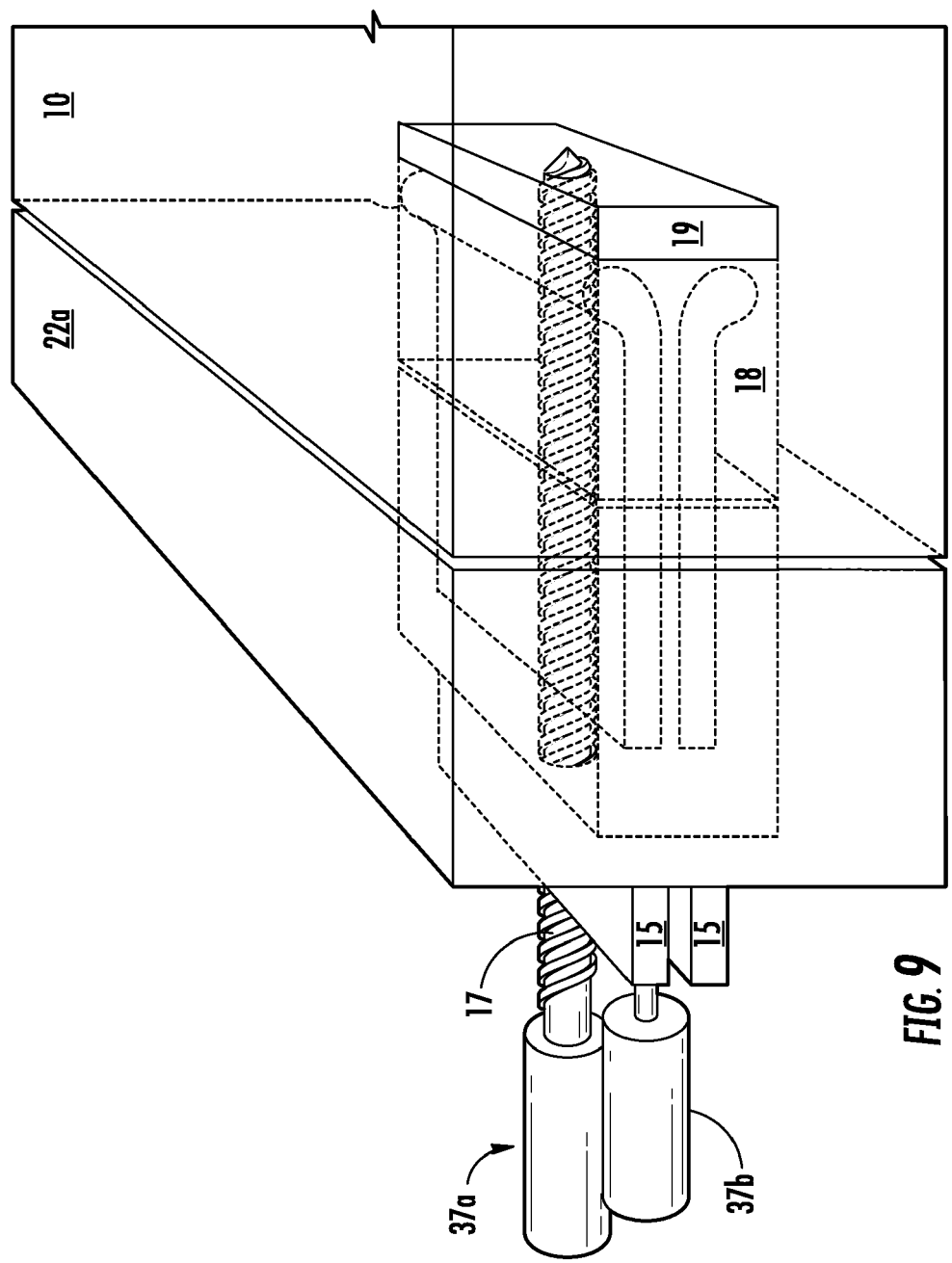
FIG. 9 is a perspective view of lockbox assembly in relation to gooseneck and deck.

Referring now to FIG. 8 and FIG. 9, alignment of the riser blocks 22a with lock boxes 18 allows lock bars 15, housed in gooseneck outer frame 30, to be activated (FIG. 9) causing the lock bars to slide through slide holes 38 in riser blocks 22a (FIG. 3) and predetermined height adjustment holes 29a-29c (FIG. 2) then continue into center deck 10 lock boxes 18. Referring to now to FIG. 9, compressed air to operate pneumatic motor 37a is supplied by the compressor of tractor 4 and stored in air cylinder 37b. (For simplicity of illustration, FIG. 9 shows just one of the two unit associated with riser blocks 22a.) Pneumatic motor 37a turns threaded rod 17 in a direction that causes it to spread the two lock bars 15 into lock boxes 18 in center deck 10 then continue into a threaded block 19 drawing and locking center deck 10 to gooseneck 13. Referring to FIG. 1b now, trailer 1 is ready for transport as a lowboy trailer.

Figure 5:
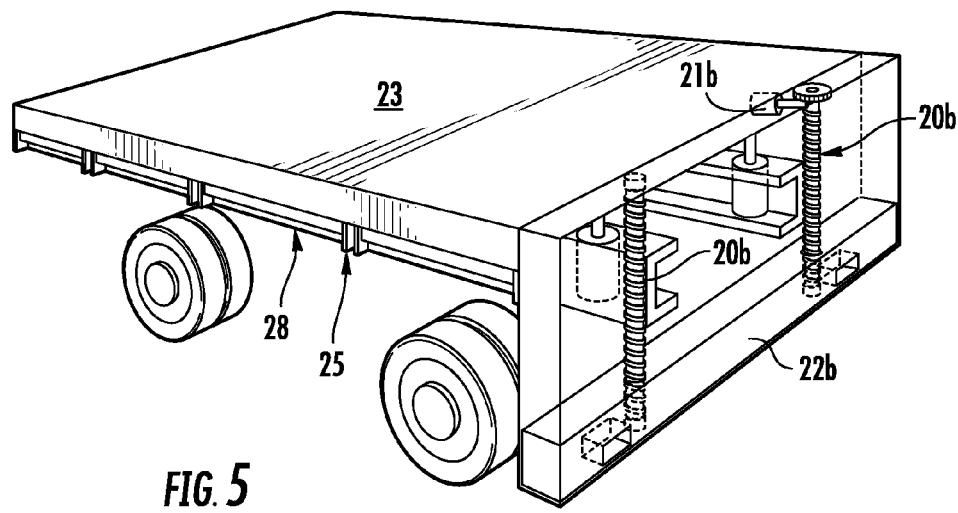
FIG. 5 and FIG. 6 are perspective views of rear deck, i.e., truck deck, of trailer illustrating rear deck raised and lowered by air system in relation to riser screws, threaded block and lock box assembly.

To move from the position shown in FIG. 1b, i.e. lowboy position, to the position shown in FIG. 1c, i.e. drop deck position, the operator unlocks lock bars 15 in gooseneck 13 by reversing the direction of pneumatic motor 37a. Next, the operator engages electric motors 21a (FIG. 4) for elevator screws 20a to raise elevator block 22 in gooseneck 13 to height adjustment holes 29b in outer frame 30 (FIG. 1a-9). Once lock boxes 18 and slide hole 38 are aligned, the operator engages lock bars 15 to lock into height adjustment holes 29b, and the operator simultaneously engages electric motors 21b turning elevator screws 20b in truck deck 23 shown in FIG. 5 to its midlevel position as shown in FIG. 5. For clarity, only one of electric motors 21b is shown in FIG. 5, but the other is in a corresponding position on the other side of truck deck 23. The function of electric motors 21b, elevator screws 20b, and height adjustment holes 29b correspond in form and function to those housed in gooseneck 13 and described above, i.e., 21a, 20a, and 29a respectively. Center deck 10 is now in the position shown in FIG. 1c, so that trailer 1 is now ready for transport as a drop deck trailer.

Moving from the drop bed position shown in FIG. 1c to the position shown in FIG. 1d, the flat bed position, follows a similar procedure to that described above. The operator unlocks lock bars 15, and engages electric motors 21a for elevator screws 20a to raise elevator block 2b and engages lock bars 15 to lock into height adjustment holes 29c. Simultaneously, the operator also engages truck deck elevators 24. When height at gooseneck 13 reaches the level shown in FIG. 1d, truck deck 23 is raised to the level in FIG. 6 by truck deck elevators 24 and locked in place by folding I-beam supporters 25 that rest on tandem beams 28 of truck 8 (FIG. 5, FIG. 6, FIG. 7a, and FIG. 7b) to an upright position. Trailer 1 is now configured as a flatbed trailer as shown in FIG. 1d.

Figure 6:
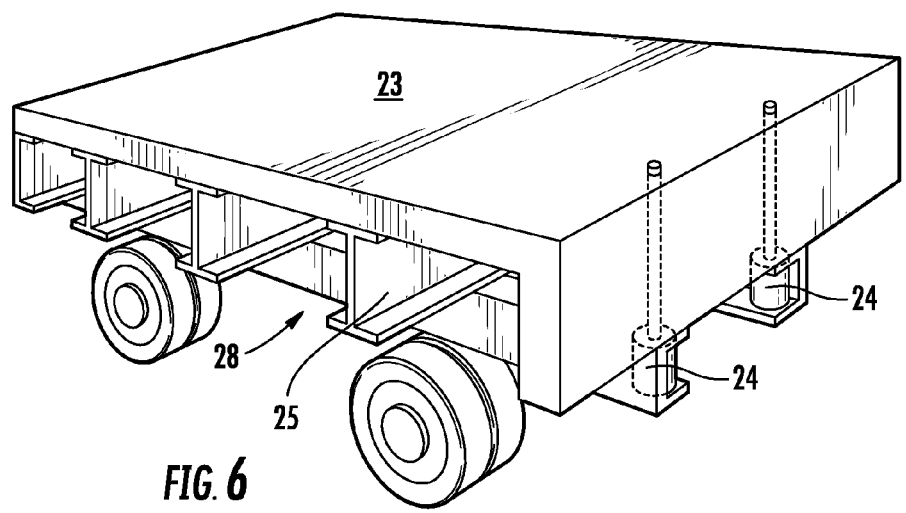
Figure 7A:
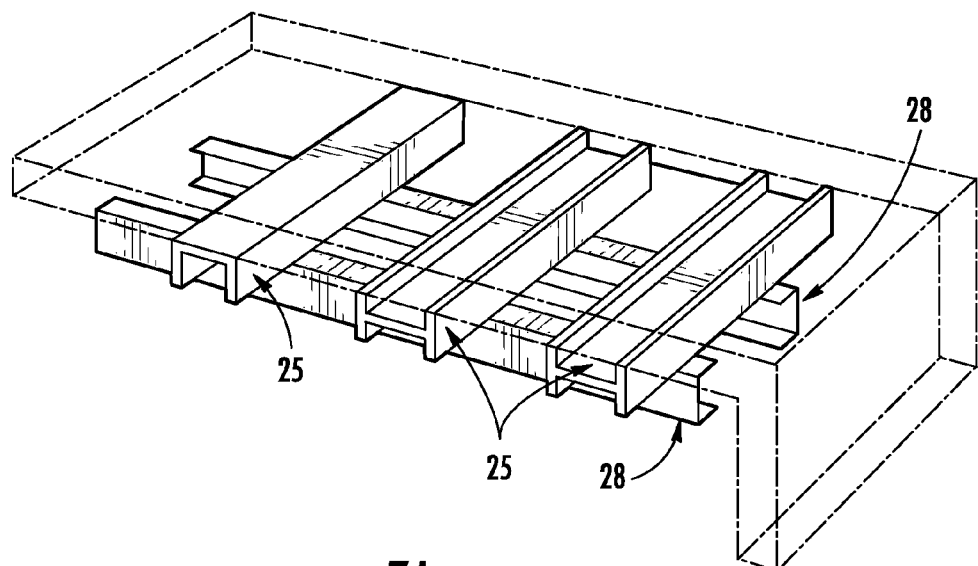
FIG. 7 is a view of I-beam supporters in a rear deck of trailer in raised (FIG. 7a) and lowered (FIG. 7b) positions in relation to tandem beams.
Figure 7B:
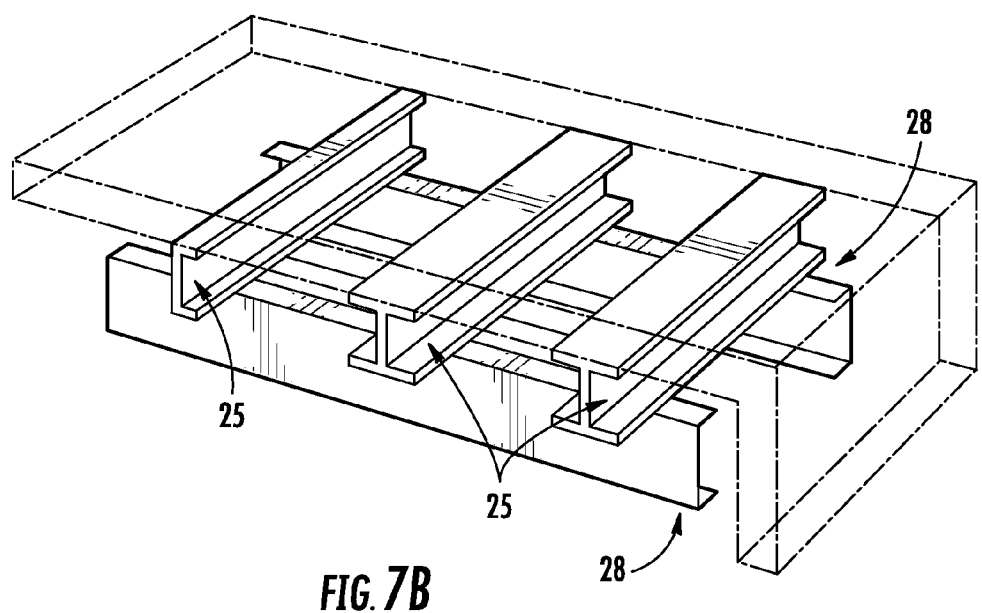

In the flatbed configuration the total, continuous deck length is the combined lengths of gooseneck deck 26 (FIG. 2), center deck 10 (FIG. 1a-1d), and truck deck 23 (FIG. 5-FIG. 6). Thus, trailer 1 configured as a flatbed has an effective continuous, single cargo carrying deck surface extending from tip of gooseneck 13 proximal to the tractor (as shown in FIG. 1d) to the distal end of the truck. Importantly, this deck surface is substantially parallel to the ground, a feature that facilitates load stability Referring to FIG. 10a-FIG. 10d, with trailer 1 configured as a drop bed (FIG. 10c) and a flatbed (FIG. 10d), landing support 35 can be used to drop center deck 10 for loading or leaving present trailer 1 parked. FIG. 10b is a bottom view of the trailer. To release the center deck 10 in positions shown in FIG. 10c and FIG. 10d, once landing support 35 is engaged, the operator disengages gooseneck 13 (FIG. 1a-1d) lock bars 15 (FIG. 8, 9) and trailer lift arm 14 (FIG. 3) is then rotated down releasing trailer lift pin 16 (FIG. 3) releasing center deck 10 from the gooseneck leaving trailer lift arm and trailer lift pin in position to reattach with no adjustments.

What I claim is:

1. A trailer for connection with a highway tractor comprising:
    a gooseneck having a deck and capable of coupling with a tractor,
    a truck assembly distal to the gooseneck
        wherein the truck assembly has a deck, a wheel assembly, and a means that is neither hydraulic nor pneumatic of moving the deck up or lower with respect to the wheel assembly and retaining the deck's position in relation to the surface supporting the wheel assembly, and
    a detachable, center section having a deck between, and connecting, the gooseneck to the truck assembly
        wherein the center section has a deck capable of being moved to any of three positions between the gooseneck and the truck assembly with each position being substantially parallel to the surface upon which the trailer is situated and
    a means of locking the center section in any one of three position between the gooseneck and the truck assembly, thereby allowing the trailer to be configured as a lowboy trailer, a drop deck trailer, or a flatbed trailer.

2. The trailer of claim 1 wherein the gooseneck deck, the truck assembly deck, and center section deck form a continuous deck when configured as a flatbed trailer, wherein the continuous deck is substantially parallel to the ground.

3. The trailer of claim 1 wherein the means of moving the center section is mechanical.

4. The trailer of claim 1 wherein the means of locking the center section in any one of three positions uses a system of locking bars and lock boxes.

5. The trailer of claim 3 wherein the mechanical means of moving the center section is by a screw mechanism.

* * * * *